United States Patent [19]

Sanders et al.

[11] Patent Number: 4,797,427

[45] Date of Patent: Jan. 10, 1989

[54] AROMATIC DIAMINES CONTAINING SULFONIC ACID ARYL ESTERS, A PROCESS FOR THEIR PRODUCTION AND THEIR USE IN THE PRODUCTION OF POLYURETHANE PLASTICS

[75] Inventors: Josef Sanders, Cologne; Helmut Reiff, Leverkusen; Gerhard Ballé, Leverkusen; Dieter Dieterich, Leverkusen, all of Fed. Rep. of Germany

[73] Assignee: Bayer Aktiengesellschaft, Bayerwerk, Fed. Rep. of Germany

[21] Appl. No.: 183,107

[22] Filed: Apr. 19, 1988

[30] Foreign Application Priority Data

Apr. 25, 1987 [DE]  Fed. Rep. of Germany ....... 3713856

[51] Int. Cl.$^4$ ............................................. C08G 18/14
[52] U.S. Cl. .................................... 521/159; 521/163; 528/44; 528/54; 528/68; 558/58
[58] Field of Search ................. 521/159, 163; 558/58; 528/64, 68, 44

[56] References Cited

U.S. PATENT DOCUMENTS 4,504,490  3/1985  Rosner et al. ....................... 558/58

Primary Examiner—Maurice J. Welsh
Attorney, Agent, or Firm—Gene Harsh; Joseph C. Gil; Thomas W. Roy

[57] ABSTRACT

The present invention is directed to new aromatic diamines containing sulfonic acid aryl esters corresponding to the formula

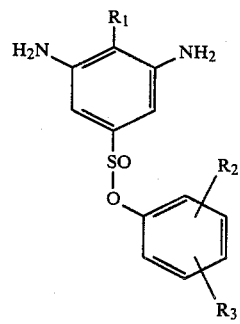

wherein
$R_1$ represents hydrogen, an optionally branched $C_1$–$C_6$ alkyl radical (preferably a methyl group), a $C_1$–$C_6$ alkoxy radical or a halogen atom (preferably chlorine) and
$R_2$ and $R_3$ which may be the same or different, represent hydrogen, an optionally branched $C_1$–$C_{20}$ (preferably $C_1$–$C_6$) alkyl radical, a $C_1$–$C_6$ alkoxy radical or a halogen atom (preferably chlorine).

The present invention is also directed to a process for the production of the above aromatic diamines containing sulfonic acid esters by the reaction of optionally substituted sulfochlorides with optionally substituted phenols followed by hydrogenation.

Finally, the present invention is directed to the use of aromatic diamines containing sulfonic acid aryl esters as a synthesis component for the production of polyurethane plastics by the isocyanate polyaddition process.

22 Claims, No Drawings

AROMATIC DIAMINES CONTAINING SULFONIC ACID ARYL ESTERS, A PROCESS FOR THEIR PRODUCTION AND THEIR USE IN THE PRODUCTION OF POLYURETHANE PLASTICS

SUMMARY OF THE INVENTION

The present invention is directed to new aromatic diamines containing sulfonic acid aryl esters corresponding to the formula

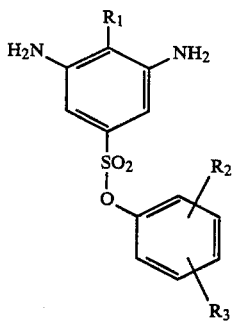

wherein $R_3$ $R_1$ represents hydrogen, an optionally branched $C_1$–$C_6$ alkyl radical (preferably a methyl group), a $C_1$–$C_6$ alkoxy radical or a halogen atom (preferably chlorine) and $R_2$ and $R_3$ which may be the same or different, represent hydrogen, an optionally branched $C_1$–$C_{20}$ (preferably $C_1$–$C_6$) alkyl radical, a $C_1$–$C_6$ alkoxy radical or a halogen atom (preferably chlorine).

The present invention is also directed to a process for the production of the above aromatic diamines containing sulfonic acid aryl esters by (a) reaction of (i) sulfochlorides corresponding to the formula

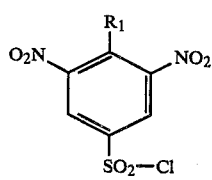

with (ii) phenols corresponding to the formula

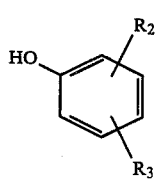

in the presence of alkaline-reacting compounds to form the corresponding dinitrosulfonic acid esters corresponding to the formula

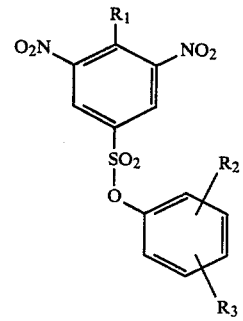

and (b) hydrogenation of the dinitrosulfonic acid esters thus formed to form the corresponding diaminosulfonic acid esters.

Finally, the present invention is directed to the use of the aromatic diamines containing sulfonic acid aryl esters as a synthesis component for the production of polyurethane plastics by the isocyanate polyaddition process.

DETAILED DESCRIPTION OF THE INVENTION

Starting materials for the process according to the invention are (i) optionally substituted dinitrosulfochlorides and
(ii) optionally mono- or disubstituted phenols.

Suitable dinitrosulfochlorides (i) include 3,5-dinitrobenzenesulfonyl chloride, 3,5-dinitro-4-methoxybenzenesulfonyl chloride, 3,5-dinitro-4-ethylbenzenesulfonyl chloride, preferably 3,5-dinitro-4-methylbenzenesulfonyl chloride (2,6-dinitrotoluene-4-sulfonyl chloride) and 3,5-dinitro-4-chlorobenzene-sulfonyl chloride. These starting compounds may be obtained in known manner by chlorination of the corresponding benzenesulfonic acid alkali salts.

Other starting materials (ii) for the process according to the invention are optionally mono- or disubstituted phenols such as phenol, 2-chlorophenol, 3-chlorophenol, 4-chlorophenol, 2,4-dichlorophenol, 2,5-dichlorophenol, 2,6-dichlorophenol, 2-methylphenol, 2-chloro-6-methylphenol, 5-chloro-2-methylphenol, 4-chloro-2-methylphenol, 3-chloro-2-methylphenol, 3-methylphenol, 2-chloro-5-methylphenol, 4-chloro-3-methylphenol, 4-methylphenol, 2-ethylphenol, 3-ethylphenol, 4-ethylphenol, 2,3-dimethylphenol, 3,4-dimethylphenol, 2-isopropylphenol, 4-isopropylphenol, 2,4-diisopropylphenol, 5-methylphenol, 2-sec.-butylphenol, 4-sec.-butylphenol, 2-tert.-butylphenol, 4-tert.-butylphenol, 3-isopropyl-5-methylphenol, 2-isopropyl-5-methylphenol, 4-tert.-pentylphenol, 2-tert.-butyl-4-methylphenol, 2,6-diisopropylphenol, 4-(1,1,3,3-tetramethylbutyl)-phenol, 2,6-di-tert.-butylphenol, 2-nonylphenol, 4-nonylphenol, 4-methoxymethylphenol, 2-methoxyphenol, 2-ethoxyphenol, 4-ethoxyphenol, 2-isopropoxyphenol, 3-isopropoxyphenol and 4-isopropoxyphenol. Phenol, 2-methylphenol, 3-methylphenol, 4-methylphenol, 2-ethylphenol and 4-ethylphenol are preferred.

Suitable alkaline-reacting compounds required for the reaction of the sulfochlorides (i) with the phenols (ii) include metal carbonates or metal hydroxides and also tertiary amines such as pyridine or trimethylamine.

Alkali carbonates or alkali hydroxides are preferred, especially potassium carbonate or sodium hydroxide.

In step (a) of the process according to the invention, the starting materials (ii) may be used in a stoichiometric quantity or also in excess or a substoichiometric quantity in relation to component (i). Preferably, there are 1 to 1.2 moles of component (ii) for each mole of component (i). As already mentioned, the hydrogen chloride released during the reaction may be bound by addition of metal carbonates, metal hydroxides or tertiary amines. The quantity used is chosen to be sufficient to neutralize the hydrogen chloride released, preferably from 1 to 3 moles of base per mole of sulfonyl groups.

Step (a) of the process according to the invention is preferably carried out in water and/or organic solvents, optionally in the presence of a phase transfer catalyst. The reactants may be present in homogeneous phase or in two phases, i.e., in solution, emulsion or suspension.

Suitable organic solvents include benzene, toluene, xylene, chlorobenzene, nitrobenzene, dichlorobenzene, diethyl ether, diisopropyl ether, tetrahydrofuran, dioxane, ethylene glycol dimethyl ether, ethylene glycol diethyl ether, methanol, ethanol, i-propanol, ethyl acetate, acetone, methylethylketone, acetonitrile, dimethylformamide, dimethylacetamide, dimethylsulfoxide, tetramethylenesulfone, furfuryl, nitromethane, nitropropane, N-methylpyrrolidinone, hexamethylenephosphoric acid triamide, tetramethyl urea, trimethyl urea, methylene chloride, chloroform, trichloroethylene, tetrachloroethylene or mixtures of these solvents.

Preferred solvents are acetone, methylethylketone, methylene chloride, chlorobenzene and toluene, optionally in admixture with water. The quantity of solvent used is chosen to be sufficient to dissolve the starting materials (i) and (ii). In practice, this means that the solvents are generally used in a quantity of about 100 to 1000 parts by weight, preferably in a quantity of about 200 to 800 parts by weight, to 100 parts by weight of the mixture of components (i) and (ii).

In some cases, it can be advantageous to carry out the reaction in the presence of a phase transfer catalyst. This procedure is preferred where water and, in addition, an organic solvent optionally immiscible with water (such as methylene chloride, chlorobenzene or toluene) are used as solvents.

Suitable phase transfer catalysts are compounds of the type described, for example, in E.V. and S.S. Dehmlow, Phase Transfer Catalysis, 2nd Edition, Verlag Chemie, Weinheim 1983.

Suitable catalysts are quaternary ammonium or phosphonium salts corresponding to the following formula

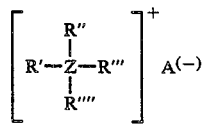

wherein
Z is nitrogen or phosphorus,
R', R", R''' and R'''', which may be the same or different, represent $C_1$–$C_{18}$ alkyl groups, in addition to which one of the radicals R', R", R''' and R'''' may be an araliphatic $C_7$–$C_{15}$ radical; the sum of the carbon atoms in the four radicals is preferably 12 to 31.
$A^{(-)}$ is an anion.

Typical examples of suitable catalysts include N-benzyl-N,N,N-triethyl ammonium chloride or bromide, N-benzyl-N-dodecyl-N,N-dimethyl ammonium chloride or bromide, N,N,N,N-tetra-n-hexyl ammonium chloride or bromide, N-benzyl-N,N,N-tri-n-octyl ammonium chloride or bromide or the phosphonium salts corresponding to these ammonium salts.

In the practical application of the process according to the invention, the quaternary ammonium or phosphonium salts mentioned by way of example are preferably used either as such or in the form of aqueous solutions (for example with a solids content of about 30 to 60% by weight) and preferably in a quantity of about 1 to 10 mole %, based on the moles of sulfonyl groups present.

Step (a) of the process according to the invention is generally carried out at about −20° to 100° C., preferably about 20° to 60° C. under excess pressure, reduced pressure or preferably ambient pressure, continuously or in batches.

The residence time is generally about 0.5 to 24 hours, preferably about 0.5 to 5 hours.

Step (a) of the process according to the invention may be carried out, for example, by initially introducing the starting materials (i) and (ii) and the phase transfer catalyst, if any, in the solvent selected and adding the base continuously or in portions in liquid or dissolved form with stirring and optionally with cooling. The mixture is then stirred at room temperature or, optionally, elevated temperature until analysis by thin layer chromatography or gas chromatography indicates complete conversion. However, the reaction may also be carried out by simultaneously mixing the optionally dissolved reaction components. Another method of carrying out the reaction is initially to introduce the phenol component (ii) and then to add the base and, finally, the sulfonyl component (i).

The reaction mixture may be worked up by methods known per se. Where water-miscible solvents are used, it is possible—in the case of solid water-insoluble reaction products—to stir the reaction mixture into water and then to isolate the reaction products precipitated in the usual way by filtration under suction. By contrast, where the reaction products are oily, the reaction mixture is best worked up by extraction using standard methods. If necessary, the crude products may be purified in the usual way, for example by recrystallization or distillation.

The dinitrosulfonic acid aryl esters obtained in step (a) of the process according to the invention are converted in step (b) into the corresponding diamines in known manner by reduction with nascent hydrogen or hydrogen activated catalytically, for example by Raney nickel or palladium on carbon. The hydrogenation is generally carried out in the presence of an inert solvent of about 20° to 120° C. and under a pressure of about 20 to 80 bar. Suitable solvents include methanol, ethanol, i-propanol, tert.-butanol, toluene, DMF, ethyl acetate, etc. Methanol is preferred. The diamines are obtained as distillation residue during removal of the solvent by distillation and, if necessary, may be purified in the usual way, for example by recrystallization or further distillation.

In general, the new diamines obtainable by the described process are thoroughly crystallized and may be used, for example, as starting material for the production of plastics (polyurethanes, polyamides, epoxides, etc). The compounds have proved to be particularly valuable as chain-extending agents in the production of plastics having elastomeric properties. Elastomers produced with chain-extending agents such as these show outstanding mechanical properties (softness, but high tear propagation resistance). In addition, the diamines according to the invention, by virtue of the sulfonic ester group, are also physiologically acceptable because they can be readily degraded in the body to the corresponding sulfonic acids. For example, 2,6-diaminotoluene-4-sulfonic acid phenyl ester was found to be Ames-negative in the Ames test.

When the diamines according to the invention are used for the production of polyurethane plastics, particularly solid or cellular polyurethane elastomers, they are reacted with the known reactants instead of the diamines hitherto used for this purpose (cf. in this connection "Kunststoff-Handbuch" Vol. VII, "Polyurethane" by Vieweg and Hochtlen, Carl-Hanser-Verlag Munchen (1966), especially pages 206–297 or EP No. 0,037,029. For example, the production of polyurethane elastomers using the diamines according to the invention is carried out by reacting them with (A) polyisocyanates, preferably diisocyanates,
(B) compounds containing at least two isocyanate-reactive hydrogen atoms and having a molecular weight of 400 to about 10,000, preferably polyhydroxyl compounds and optionally
(C) other compounds containing at least two isocyanate-reactive hydrogen atoms and having a molecular weight of 32 to 399 as additional chain-extending agents, optionally in the presence of
(D) activators, blowing agents and/or other auxiliaries and additives known per se.

Suitable representatives of the starting components mentioned under (A) and (D) are described, for example, in EP No. 0,037,029 (U.S. Pat. No. 4,587,275, herein incorporated by reference in its entirety).

The reaction may be carried out by the known prepolymer process by reaction of the polyisocyanate (A) with component (B) maintaining an equivalent ratio of isocyanate groups to isocyanate-reactive groups of greater than about 1.3:1 and subsequent reaction of the NCO prepolymer thus obtained with the diamines according to the invention, optionally using further components (C) and (D) or also in one stage by reaction of the polyisocyanate (A) with a mixture of the diamines according to the invention, component (B) and, optionally, components (C) and (D). In both variants, the equivalent ratio of isocyanate groups to the total quantity of isocyanate-reactive groups is generally about 0.8:1 to 1.3:1, preferably about 0.95:1 to 1.1:1. The temperatures at which these reactions are carried out are generally about 60° to 180° C., preferably about 80° to 150° C. The reactions may be carried out in the presence or in the absence of suitable inert solvents.

The invention is further illustrated but is not intended to be limited by the following examples in which all parts and percentages are by weight unless otherwise specified.

EXAMPLES

EXAMPLE 1

(a) Preparation of 2,6-dinitrotoluene-4-sulfochloride

A mixture of 757 g (2 moles) 2,6-dinitrotoluene-4-sulfonic acid sodium salt (approx. 75%), 614 g (4 moles) phosphorus oxychloride, 800 ml acetonitrile and 800 ml tetramethylenesulfone was heated with stirring for 4 hours to 70° C. After cooling, the reaction mixture was hydrolyzed by carefully pumping in 4 liters ice water. The precipitated product was filtered off under suction, washed with water until neutral and dried in vacuo at 50° C.

Yield: 527 g (94% of the theoretical)
Mp: 126°–127° C. (pale yellowish crystals)
Elemental analysis: $C_7H_5ClN_2O_6S$: 280.64. Calculated: C: 29.96%; H:1.80%; Cl: 12.63%; N: 9.98%. Found: C: 29.90%; H: 1.60%; Cl: 12.90%; N: 10.10%.

(b) Preparation of 2,6-dintiro-4-sulfonic acid phenyl ester 148.7 g (1.58 moles) phenol were added in portions to a solution of 420 g (1.5 moles) 2,6-dinitrotoluene-4-sulfonic acid chloride (from the sulfolan process) in 150 ml acetone, followed by stirring for another hour; the mixture underwent an increase in temperature to 40° C. 159.9 g (1.58 moles) triethylamine were then added dropwise with cooling at 30° C. over a period of 2 hours, followed by stirring for another 2 hours. After filtration from the precipitated hydrochloride, the solvent was removed and the residue was thoroughly washed with ethanol and dried in vacuo.

Yield: 482 g (95% of the theoretical)
Mp.: 94°–95° C. (colorless crystals).
Elemental analysis: $C_{13}H_{10}N_2O_7S$: 338.30. Calculated: C: 46.16%; H: 2.98%; N: 8.28%. Found: C: 46.60%; H: 3.00%; N: 8.20%.

(c) Preparation of 2,6-diaminotoluene-4-sulfonic acid phenyl ester 900 g (2.66 moles) 2,6-dinitrotoluene-4-sulfonic acid phenyl ester dissolved in 4.5 liters methanol were hydrogenated at a maximum internal of 100 g (11%) Raney nickel. After the uptake of hydrogen had stopped, the catalyst was separated off at 50° C. and the solvent was removed. The pasty residue remaining behind was washed twice with cold methanol, filtered off under suction and dried in vacuo.

Yield: 600 g (81% of the theoretical)
Mp.: 133° C. (almost colorless crystals).
Elemental analysis: $C_{13}H_{14}N_2O_3S$: 278.33. Calculated: C: 56.10%; H: 5.07%; N: 20.06%. Found: C: 56.10%; H: 4.90%; N: 10.10%.

EXAMPLE 2

(a) Preparation of 2,6-dinitrotoluene-4-sulfonic acid-2'-isopropyl phenyl ester 90 g (0.33 mole) of a 50% $K_2CO_3$ solution were added with stirring at room temperature to a solution of 91.6 g (0.33 mole) 2,6-dinitrotoluene-4-sulfochloride, 97.7 g (0.35 mole) 2-isopropylphenol and 7.4 triethyl benzyl ammonium chloride in 900 ml methylene chloride, followed by stirring for another 2 hours at that temperature. The aqueous phase was then separated off, the organic phase was washed twice with water and then dried over $Na_2SO_4$. After removal of the solvent, the crude product was washed with cold isopropanol and dried in vacuo.

Yield: 119 g (95% of the theoretical)
Mp.: 95°–96° C. (almost colorless crystals).

(b) Preparation of 2,6-diaminotoluene-4-sulfonic acid-2'-isopropyl phenyl ester 152 g (0.4 mole) 2,6-dinitrotoluene-4-sulfonic acid-2'-isopropyl phenyl ester were hydrogenated as in Example 1(c) on 16 g Raney nickel in 900 ml methanol.

Crude yield: 115 g (90% of the theoretical)
Mp.: 125°–130° C. (brownish crystals)
Pure yield: 95 g (74% of the theortical)

Mp.: 133° C. (almost colorless crystals from i-propanol)

Elemental analysis: $C_{16}H_{20}N_2O_3$: 320.41. Calculated: C: 59.98%; H: 6.29%; N: 8.74%. Found: C: 60.10%; H: 6.10%; N: 8.80%.

EXAMPLE 3

(a) Preparation of 2,6-dinitrotoluene-4-sulfonic acid p-cresyl ester 182.3 g (0.65 mole) 2,6-dinitrotoluene-4-sulfonic acid chloride, 73.6 g (0.68 mole) p-cresol, 180 g (0.65 mole) of a 50% $K_2CO_3$ solution and 14.8 g triethyl benzyl ammonium chloride were reacted as in Example 2(a) in 1800 ml methylene chloride.

Crude yield: 215 g (94% of the theoretical)
Mp.: 114°–118° C. (brownish crystals)
Pure yield: 165 g (72% of the theoretical)
Mp.: 120°–122° C. (almost colorless crystals from i-propanol)

(b) Preparation of 2,6-diaminotoluene-4-sulfonic acid p-cresyl ester 140.8 g (0.4 mole) 2,6-dinitrotoluene-4-sulfonic acid p-cresyl ester were hydrogenated as in Example 1(c) on 14 g Raney nickel in 850 ml methanol.

Crude yield: 113 g (93% of the theoretical)
Mp.: 149°–153° C. (brown crystals)
Pure yield: 89 g (77% of the theoretical)
Mp.: 154°–156° C. (light brown crystals from i-propanol)

Elemental analysis: Chd $14H_{16}N_2O_3S$: 292.36. Calculated: C: 57.52%; H: 5.52%; N: 9.58%. Found: C: 57.70%; H: 5.40%; N: 9.60%.

EXAMPLE 4

(a) Preparation of 2,6-dinitrotoluene-4-sulfonic acid m-cresyl ester 182.3 g (0.65 mole) 2,6-dinitrotoluene-4-sulfonic acid chloride, 73.6 g (0.68 mole) m-cresol, 180 g (0.65 mole) of a 50% $K_2CO_3$ solution and 14.8 g triethyl benzyl ammonium chloride were reacted as in Example 2(a) in 1800 ml methylene chloride.
Crude yield: 210 g (92% of the theoretical)
Mp.: 90°–94° C. (brownish crystals)
Pure yield: 163 g (71% of the theoretical)
Mp.: 94°–95° C. (almost colorless crystals from i-propanol)

(b) Preparation of 2,6-diaminotoluene-4-sulfonic acid m-cresyl ester 151.4 g (0.43 mole) 2,6-dinitrotoluene-4-sulfonic acid m-cresyl ester were hydrogenated on 15 g Raney nickel in 900 g methanol as in Example 1(c).

Crude yield: 125 g (quantitative)
Mp.: 130°–136° C. (brown crystals)
Pure yield: 89 g (71% of the theoretical)
Mp.: 137°–139° C. (light brown crystals from toluene)

Elemental analysis: $C_{14}H_{16}N_2O_3S$: 292.36. Calculated: C: 57.52%; H: 5.52%; N: 9.58%. Found: C: 57.60%; H: 5.30%; N: 9.40%.

EXAMPLE 5

(a) Preparation of 2,6-dinitrotoluene-4-sulfonic acid-2'-ethyl phenyl ester 182.3 g (0.65 mole) 2,6-dinitroroluene-4-sulfonic acid chloride, 83 g (0.68 mole) 2-ethylphenol, 180 g (0.65 mole) of a 50% $K_2CO_3$ solution and 14.8 g triethyl benzyl ammonium chloride were reacted in 1800 ml methylene chloride as in Example 2(a).

Crude yield: 231 g (97% of the theoretical)
Mp.: 81°–85° C. (brownish crystals)
Pure yield: 194 g (81% of the theoretical)
Mp.: 87°–88° C. (almost colorless crystals from i-propanol)

(b) Preparation of 2,6-dinitrotoluene-4-sulfonic acid-2'-ethyl phenyl ester 410 g (1.12 moles) 2,6-dinitrotoluene-4-sulfonic acid-2'-ethyl phenyl ester were hydrogenated as in Example 1(c) on 50 g Raney nickel in 2100 ml methanol.

Crude yield: 328 g (96% of the theoretical)
Mp.: 95°–98° C. (brownish crystals)
Pure yield: 280 g (82% of the theoretical)
Mp.: 98°–100° C. (light brown crystals from i-propanol)

Elemental analysis: $C_{15}H_{18}N_2O_3S$: 306.39. Calculated: C: 58.80%; H: 5.92%; N: 9.14%. Found: C: 58.90%; H: 5.80%; N: 9.00%.

EXAMPLE 6

(a) Preparation of 3,5-dinitro-4-chlorobenzenesulfonic acid chloride 760 g (2 moles) 3,5-dinitro-4-chlorobenzenesulfonic acid potassium salt (approx. 85%) and 614 g (4 moles) phosphorus oxychloride were reacted as in Example 1(a) in 800 ml acetonitrile and 800 ml tetramethylenesulfone.

Yield: 550 g (91% of the theoretical)
Mp.: 89°–91° C. (light beige crystals)

Elemental analysis: $C_6H_2Cl_2N_2O_6S$: 301.06. Calculated: C: 23.94%; H: 0.67%; Cl: 23.55%; N: 9.30%. Found: C: 24.2%; H: 0.9%; Cl: 23.2%; N: 9.3%.

(b) Preparation of 3,5-dinitro-4-chlorobenzene sulfonic acid-2'-methoxyphenyl ester 195.7 g (0.65 mole) 3,5-dinitro-4-chlorobenzenesulfonic acid chloride, 84.4 g (0.68 mole) 2-methoxyphenol, 180 g (0.65 mole) of a 50% K2CO3 solution and 14.8 g triethyl benzyl ammonium chloride were reacted as in Example 2(a).

Crude yield: 206 g (82% of the theoretical)
Mp.: 143°–147° C. (brownish crystals)
Pure yield: 147 g (58% of the theoretical)
Mp.: 151°–152° C. (light yellow crystals from ethylene glycol monomethyl ether acetate)

(c) Preparation of 3,5-diamino-4-chlorobenzenesulfonic acid-2'-methoxyphenyl ester 155.5 g (0.4 mole) 3,5-dinitro-4-chlorobenzenesulfonic acid-2'-methoxyphenyl ester were hydrogenated as in Example 1(c) on 16 g Raney nickel in 900 ml methanol.

Crude yield: 122 g (93% of the theoretical)
Mp.: 135°–141° C. (brown crystals)
Pure yield: 84 g (64% of theoretical)
Mp.: 143°–145° C. (light brown crystals from toluene)

Elemental analysis: $C_{13}H_{13}ClN_2O_4S$: 328.78. Calculated: C: 47.49%; H: 3.99%; N: 8.52%. Found: C: 50.2%; H: 4.3%; N: 8.3%.

APPLICATION EXAMPLES

EXAMPLE I 2000 g of a polyester (MW 2000, OH number 56) obtained from adipic acid and ethylene glycol were heated to 70°–80° C. with 360 g 2,4-diisocyanatotoluene and kept at that temperature until the NCO content was 3.8–3.9%. 500 g of the prepolymer were briefly degassed in vacuo at 80° C. and mixed in 30 seconds with 71 g molten 2,6-diaminotoluene-4-sulfonic acid phenyl ester (Mp.: 133° C.).

The reaction mixture was poured in about 3 to 5 minutes into a mold heated to 100° C. After 15 minutes, the test specimen was removed from the mold and then tempered for 24 hours at 120° C. The mechanical properties of the polyurethane elastomer thus obtained are shown in Table 1.

EXAMPLE II 500 g of the NCO prepolymer (NCO content 3.9%) described in Example I were mixed with 78.1 g 2,6-diaminotoluene-4-sulfonic acid-2'-ethyl phenyl ester (Mp.: 98°-100° C.) and further processed as described in the Example I. The mechanical properties of the polyurethane elastomer thus obtained are shown in Table 1.

TABLE 1

|  | Example I | Example II |
|---|---|---|
| Hardness, Shore A | 78 | 78 |
| Modulus (100%), MPa | 3.7 | 4.1 |
| Tensile strength, MPa | 37.5 | 40.5 |
| Elongation at break, % | 650 | 600 |
| Tear propagation resistance KN/M | 53.3 | 44.5 |
| Elasticity, % | 21 | 20 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aromatic diamine containing a sulfonic acid aryl ester corresponding to the formula

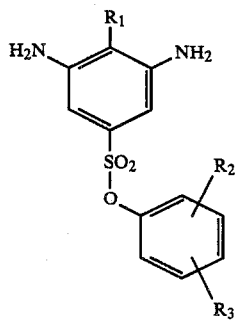

wherein
  $R_1$ represents hydrogen, an optionally branched $C_1$-$C_6$ alkyl radical, a $C_1$-$C_6$ alkoxy radical or a halogen atom,
  $R_2$ and $R_3$, which may be the same or different, represent hydrogen, an optionally branched $C_1$-$C_{20}$ alkyl radical, a $C_1$-$C_6$ alkoxy radical or a halogen atom.

2. The diamine of claim 1 wherein $R_1$ is a $C_1$-$C_6$ alkyl radical.

3. The diamine of claim 1 wherein $R_1$ is a methyl group or chlorine.

4. The diamine of claim 1 wherein $R_1$ is hydrogen.

5. The diamine of claim 1 wherein $R_2$ and $R_3$ represent optionally branched $C_1$-$C_6$ alkyl radicals.

6. The diamine of claim 2 wherein $R_2$ and $R_3$ represent optionally branched $C_1$-$C_6$ alkyl radicals.

7. The diamine of claim 4 wherein $R_2$ and $R_3$ represent optionally branched $C_1$-$C_6$ alkyl radicals.

8. The diamine of claim 1 wherein $R_2$ is hydrogen.

9. The diamine of claim 2 wherein $R_2$ is hydrogen.

10. The diamine of claim 4 wherein $R_2$ is hydrogen.

11. The diamine of claim 8 wherein $R_3$ is a $C_1$-$C_6$ alkoxy radical.

12. The diamine of claim 9 wherein $R_3$ is a $C_1$-$C_6$ alkoxy radical.

13. The diamine of claim 10 wherein $R_3$ is a $C_1$-$C_6$ alkoxy radical.

14. The diamine of claim 8 wherein $R_3$ is an optionally branched $C_1$-$C_6$ alkyl radical.

15. The diamine of claim 9 wherein R is an optionally branched $C_1$-$C_6$ alkyl radical.

16. The diamine of claim 10 wherein $R_3$ is an optionally branched $C_1$-$C_6$ alkyl radical.

17. The diamine of claim 8 wherein $R_3$ represents hydrogen, a methyl radical or an ethyl radical.

18. The diamine of claim 9 wherein $R_3$ represents hydrogen, a methyl radical or an ethyl radical.

19. The diamine of claim 10 wherein $R_3$ represents hydrogen, a methyl radical or an ethyl radical.

20. A process for the production of an aromatic diamine containing a sulfonic acid aryl ester corresponding to the formula

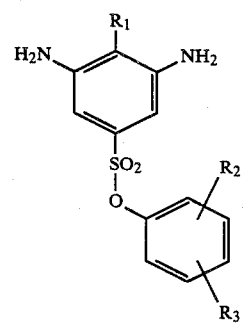

wherein
  $R_1$ represents hydrogen, an optionally branched $C_1$-$C_6$ alkyl radical, a $C_1$-$C_6$ alkoxy radical or a halogen atom,
  $R_2$ and $R_3$, which may be the same or different, represent hydrogen, an optionally branched $C_1$-$C_{20}$ alkyl radical, a $C_1$-$C_6$ alkoxy radical or a halogen atom;
  (a) which comprises reacting an aromatic sulfochloride corresponding to the formula

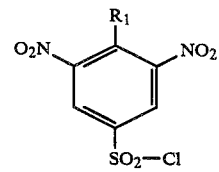

with a phenol corresponding to the formula

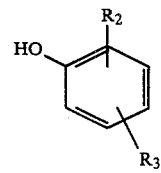

in the presence of alkaline-reacting compounds and (b) hydrogenating the dinitrosulfonic acid ester product corresponding to the formula

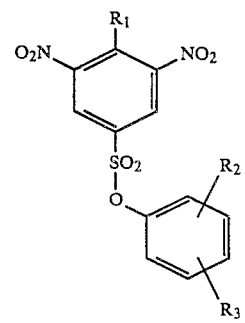

to form the corresponding

21. A process for the preparation of an optionally cellular polyurethane plastic which comprises reacting
(A) a polyisocyanate with
(B) a compound containing at least two isocyanate-hydrogen atoms and having a molecular weight of 400 to about 10,000 and
(C) the diamine of claim 1 and optionally an additional compound containing at least two isocyanate-reactive hydrogen atoms and having a molecular weight of 32 to 399.

22. The process of claim 21 wherein component (B) comprises a compound having at least two hydroxyl groups.

* * * * *